No. 765,961. PATENTED JULY 26, 1904.
T. B. DORNAN.
WOVEN FABRIC.
APPLICATION FILED MAY 14, 1904.
NO MODEL. 3 SHEETS—SHEET 1.
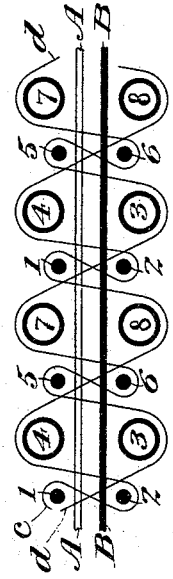
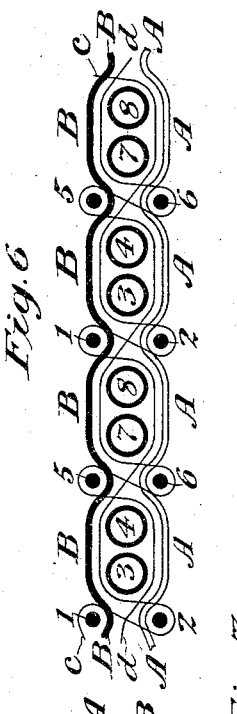
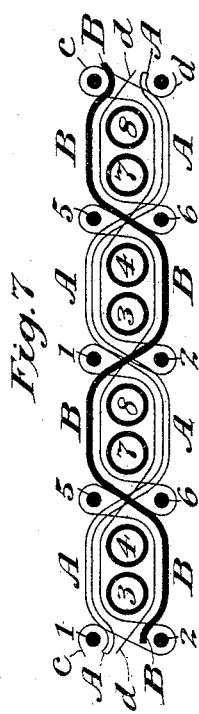
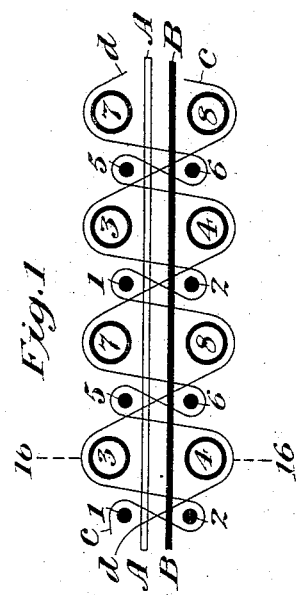
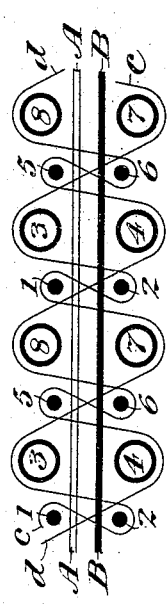
Witnesses
Albert V. T. Day
Henry B. Innes
Inventor:
Thomas Benton Dornan
by Henry D. Williams
Atty.

No. 765,961. PATENTED JULY 26, 1904.
T. B. DORNAN.
WOVEN FABRIC.
APPLICATION FILED MAY 14, 1904.
NO MODEL. 3 SHEETS—SHEET 2.
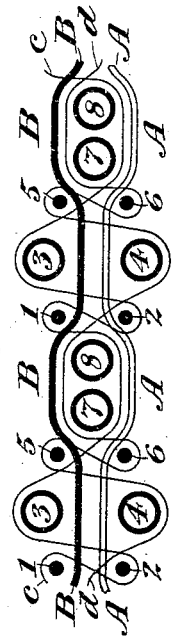
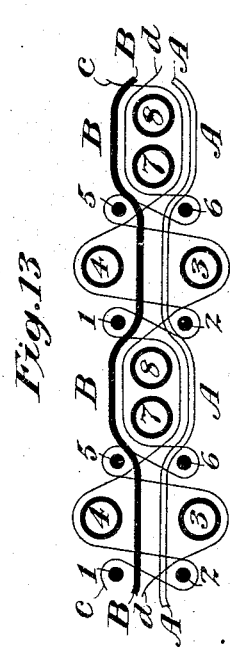
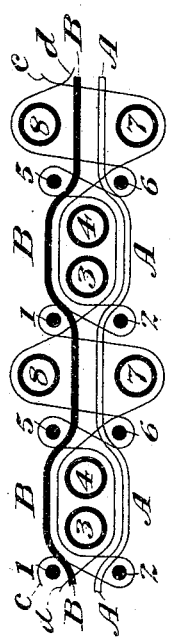
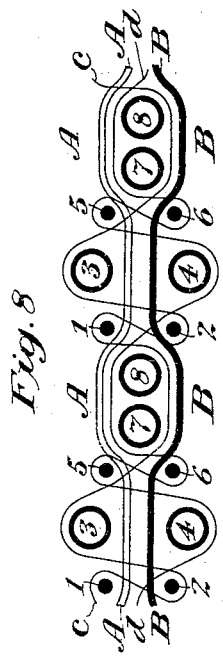
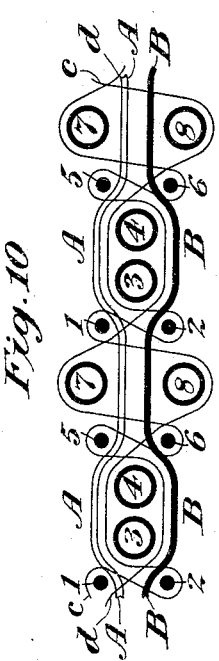
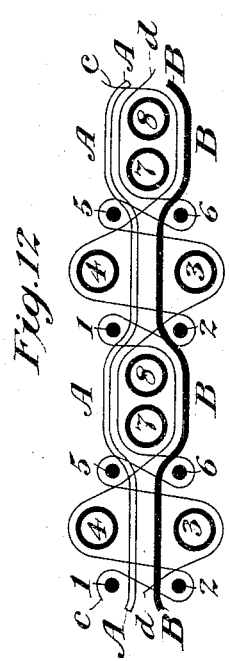
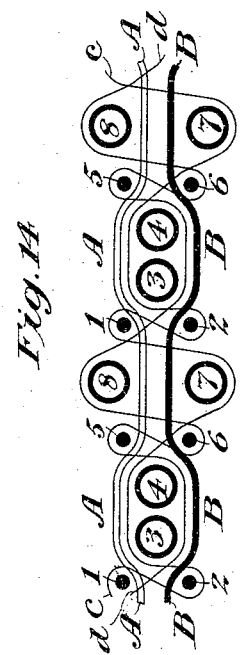
Witnesses:
Albert V. F. Day
Henry Barkes
Inventor:
Thomas Benton Dornan
by Henry D. Williams
Atty.

No. 765,961. PATENTED JULY 26, 1904.
T. B. DORNAN.
WOVEN FABRIC.
APPLICATION FILED MAY 14, 1904.
NO MODEL. 3 SHEETS—SHEET 3.
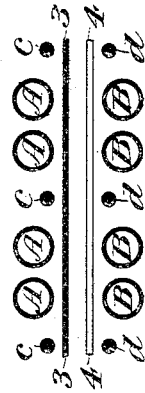
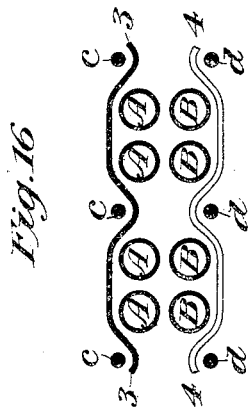
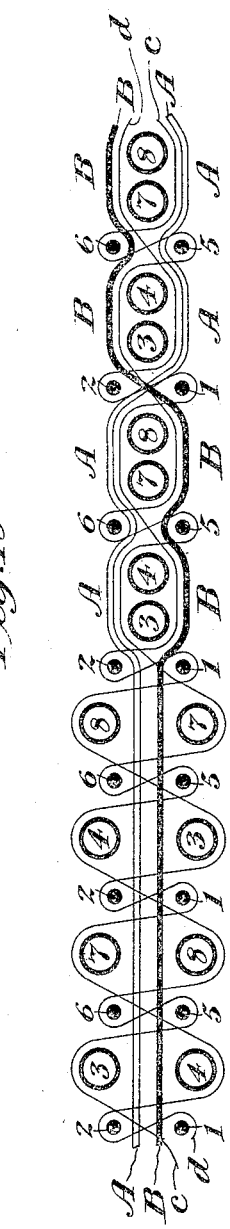
Witnesses:
Albert V. T. Day
Henry Barnes
Inventor:
Thomas Benton Dornan
by Henry L. Williams
Atty.

No. 765,961.  
Patented July 26, 1904.

UNITED STATES PATENT OFFICE.

THOMAS BENTON DORNAN, OF PHILADELPHIA, PENNSYLVANIA.

WOVEN FABRIC.

SPECIFICATION forming part of Letters Patent No. 765,961, dated July 26, 1904.

Application filed May 14, 1904. Serial No. 207,950. (No specimens.)

*To all whom it may concern:*

Be it known that I, THOMAS BENTON DOR-NAN, a citizen of the United States, residing at Philadelphia, in the county of Philadelphia and State of Pennsylvania, have invented certain new and useful Improvements in Woven Fabrics, of which the following is a specification, reference being had therein to the accompanying drawings, forming a part thereof.

My invention relates to woven fabrics such as are used for carpets and rugs, and more particularly to that class of such fabrics in which the pattern and color effects are produced by figuring weft-threads and figuring warp-threads associated with suitable binder-threads.

My invention has for its objects tight weaving and homogeneity, with consequent durability and strength; an arrangement of binder warp-threads so that a heavy strain is placed upon them at the points where they perform the work of binding the binder weft-threads, thereby embedding all of the binder-threads in the fabric and minimizing their visibility on the face of the fabric and deeply indenting the figuring-threads; reversibility of the fabric, economy in the cost of production, purity of color effects and embossed appearance, and the attainment of a considerable number and variety of colorings and contrasting varieties of structural appearance.

Other objects of my invention will appear from the following description of the carpet fabric shown in the accompanying drawings and embodying my invention. I will now describe such fabric and will thereafter point out my invention in claims.

Figures 1 to 15, inclusive, are diagrammatical longitudinal sections or sections taken on planes parallel to the warp-threads and at right angles to the weft-threads of portions of the fabric, each view showing two consecutive sets of weft-threads and the different views showing the different arrangements or color effects attainable in one fabric with one sequence of threads. Fig. 16 is a transverse section of a portion of the fabric on a plane indicated by the line 16 16, Fig. 1. Fig. 17 is a similar view on a plane indicated by the line 17 17, Fig. 5. Fig. 18 is a longitudinal section of a portion of the fabric, showing a slightly-modified arrangement of binder-threads. The several effects of Figs. 1, 2, 5, and 6 are here successively shown with this slightly-modified arrangement of threads.

In the several views the threads shown in cross-section are exaggerated in size relatively to the threads longitudinally shown, and the threads longitudinally shown are vertically separated for clearness of illustration, their approximate relative positions being shown where they are in cross-section.

The fabric is provided with binder weft-threads and figuring weft-threads in sets of eight weft-threads each, each set comprising in succession two binder weft-threads 1 and 2, two figuring weft-threads 3 and 4, two binder weft-threads 5 and 6, and two figuring weft-threads 7 and 8. Where solid colored effects are desirable, the two figuring weft-threads 3 and 7 will both be of the same color and the two figuring weft-threads 4 and 8 will both be of the same color. Assuming such a disposition of colors, the figuring weft-threads 3 and 7 may be black and the figuring weft-threads 4 and 8 may be red. The binder weft-threads contribute to the color effects only in that they form thin transverse lines between the figuring-threads, and we may assume that all of the binder weft-threads are brown. As, however, the binder weft-threads may be maintained always in the same ply throughout a fabric, they may be differently colored to harmonize with prevailing color effects on the face and back of the fabric.

The fabric is provided with binder warp-threads and figuring warp-threads. We may assume that the figuring warp-thread A is of écru color and that the figuring warp-thread B is of blue color. The binder warp-threads *c* and *d* merely form thin longitudinal lines between the figuring-threads, and we may assume that they are black. They repeatedly pass from ply to ply throughout the fabric.

The sequence of the weft-threads is indicated by their numbers. The arrangement of warp-threads is shown in Figs. 17 and 18. The arrangement shown would provide in each dent of the reed in succession a figuring warp-thread A, a figuring warp-thread B, two binder warp-threads c and d, a figuring warp-thread A, and a figuring warp-thread B. This enables the figuring warp-threads to be brought to the surface in pairs of the same color, the several pairs of figuring warp-threads on each surface being separated by binder warp-threads.

In the weaving of the fabric shown the binder warp-threads may be controlled by journals or heddles. The lifts of the figuring warp-threads are the same throughout the fabric and are as follows: first shot, binder c up; second shot, binder d up; third shot, binder c up; fourth shot, binder c up; fifth shot, binder d up; sixth shot, binder c up; seventh shot, binder d up; eighth shot, binder d up. The figuring warp-threads are preferably controlled by jacquard mechanism for selecting and lifting the threads to produce the desired pattern and color effects.

In the weaving of the color effect shown in Fig. 1, which is a weft effect and would be solid black on the face and solid red on the back with the colors above mentioned, the lifting of the binder warp-threads would be as above stated, the binder-warp c being up and the binder-warp d and the figuring-warps A and B down for the first shot, the binder-warp d and the figuring-warps A and B up and the binder-warp c down for the second shot, the binder-warp c up and the binder-warp d and figuring-warps A and B down for the third shot, the binder-warp c and the figuring-warps A and B up and the binder-warp d down for the fourth shot, the binder-warp d up and the binder-warp c and the figuring-warps A and B down for the fifth shot, the binder-warp c and the figuring-warps A and B up and the binder-warp d down for the sixth shot; the binder-warp d up and the binder-warp c and the figuring-warps A and B down for the seventh shot, and the binder-warp d and the figuring-warps A and B up and the binder-warp c down for the eighth shot. This completes one set or unit of weaving and is exactly repeated in the second set shown. By reason of the alternate lifting of the figuring warp-threads the successive shots will go to the different plies and alternate shots to the same ply, the wefts 1, 3, 5, and 7 being in the upper ply and wefts 2, 4, 6, and 8 in the lower ply. The binder warp-thread c is woven first over the upper-ply binder weft-thread 1, then through the fabric to the lower ply and under the lower-ply binder weft-thread 2, and then back through the fabric to the upper ply and over the figuring weft-thread 3. The binder warp-thread d is first woven under the upper-ply binder weft-thread 1 and over the lower-ply binder weft-thread 2 and through the fabric and under the lower-ply figuring weft-thread 4. The binder warp-thread d is then woven over the upper-ply binder weft-thread 5, passing upward through the fabric from the lower ply to the upper ply and then under the lower-ply binder weft-thread 6, passing downward from the upper ply to the lower ply and then over the upper-ply figuring weft-thread 7, again passing upward from the lower ply to the upper ply, while the binder warp-thread c after passing over the upper-ply figuring weft-thread 3 passes under the upper-ply binder weft-thread 5 and over the lower-ply binder weft-thread 6 and through the fabric to the lower ply and under the lower-ply figuring weft-thread 8.

Each binder warp-thread when it performs the work of successively binding two binder weft-threads, one in each ply, is drawn to some extent rearwardly as it passes from ply to ply from one binder weft-thread to the other and is subjected to a particularly heavy strain, which causes it to very tightly bind the binder weft-threads. On the other hand, after it binds a figuring weft-thread it passes easily forward and through the fabric to bind another widely-separated figuring weft-thread and is not subjected to the heavy strain until it is again employed to bind the binder weft-threads. For example, the binder warp-thread d binds the figuring weft-thread 4 of the lower ply, then binds the binder weft-thread 5 of the upper ply, then binds the binder weft-thread 6 of the lower ply, and then binds the figuring weft-thread 7 of the upper ply, thus binding successively in different plies four successive weft-threads, of which the two intermediate threads are binder-threads, and then passes easily through the fabric to bind the figuring weft-thread 4 of the lower ply in the second set, while the weft-threads intermediate between the figuring weft-thread 7 of the first set and the figuring weft-thread 4 of the second set—to wit, the figuring weft-thread 8 of the first set and the binder weft-threads 1 and 2 and the figuring weft-thread 3 of the second set—have been in like manner bound by the other binder warp-thread c. Thus in each set the binder warp-thread c binds the weft-threads 1, 2, 3, and 8, and the binder weft-thread d binds the weft-threads 4, 5, 6, and 7, and each binder warp-thread in passing from figuring weft-thread to figuring weft-thread passes easily through the fabric, as from the weft-thread 3 to the weft-thread 8 or from the weft-thread 7 of one set to the weft-thread 4 of the next set, while in passing from binder weft-thread to binder weft-thread it passes tightly and somewhat backwardly through the fabric, as from the weft-thread 1 to the weft-thread 2 or from the weft-thread 5 to the weft-thread 6. It will be noted also that each binder warp-thread binds four weft-threads of each set, and thus the work of the two binder warp-threads is equalized, so that the binder-warps are taken off equally from the warp-beam.

In the arrangement of threads shown in Fig. 2 the color effect with the colors above mentioned would be solid red at the face and solid black at the back of the fabric. This also is a weft effect. The different manipulation of the figuring warp-threads to weave this structure will be obvious from the drawings and from the description above given.

In the construction shown in Fig. 3 the color effect will be black and red in the upper ply and red and black in the lower ply, while in the arrangement shown in Fig. 4 the color effect will be red and black in the upper ply and black and red in the lower ply. This affords a different arrangement or sequence of colors. With a different color for each figuring weft-thread these four varieties of arrangement in the weft effects would produce four different combinations of two colors each. In the several weft effects the figuring warp-threads are within the fabric and act as stuffers to separate the figuring weft-threads and produce an embossed effect, the binder warp-threads acting as binders for the figuring weft-threads.

Figs. 5 to 7, inclusive, show three different warp effects. In Fig. 5 the figuring warp-thread A, which may be écru, appears on the face of the fabric and the figuring warp-thread B, which may be blue, appears on the back of the fabric. In the weaving of this warp effect and, in fact, in all effects shown in Figs. 1 to 15, inclusive, the disposition of warp-threads for the first and second shots and for the fifth and sixth shots is the same as above described relative to the effect shown in Fig. 1. For the third shot the binder $c$ is up, the figuring-warp A is up, and the binder $d$ and figuring-warp B are down. For the fourth shot the shed is unchanged. The sheds for the seventh and eighth shots are the same as for both the third and fourth shots. Thus the figuring weft-threads go to the center of the fabric and act as stuffers to separate the figuring warp-threads, and the binder weft-threads indent the figuring warp-threads and produce an embossed effect.

Fig. 6 exhibits solid blue at the face and solid écru at the back of the fabric. Fig. 7 exhibits écru and blue at the face and blue and écru at the back. Obviously the succession of the colors exhibited in the construction shown in Fig. 7 could be changed so that the effect would be blue and écru at the face and écru and blue at the back. Figs. 8 to 15, inclusive, show the eight possible varieties of contrasting warp and weft effects, one warp effect and one weft effect being combined in each set or unit of weaving. In Fig. 8 the colors would be black and écru at the face and red and blue at the back, in Fig. 9 black and blue at the face and red and écru at the back, in Fig. 10 écru and black at the face and blue and red at the back, and in Fig. 11 blue and black at the face and écru and red at the back. In Fig. 12 the colors would be red and écru at the face and black and blue at the back, in Fig. 13 red and blue at the face and black and écru at the back, in Fig. 14 écru and red at the face and blue and black at the back, and in Fig. 15 blue and red at the face and écru and black at the back. With different colors for each figuring weft-thread these several variations of structural arrangement would of course exhibit a greater variety of colorings.

In the modified construction shown in Fig. 18 the control of the figuring warp-threads has been altered, so that the first and fifth shots will go to the lower ply and the second and sixth shots to the upper ply. This reverses the slant of the binder warp-threads, but does not change the essential structure or visibly alter the external appearance of the fabric.

It will be observed that in this fabric each binder weft-thread is in a separate loop of the binder warp-threads, while the figuring weft-threads are always arranged two in a loop of binder warp-threads, and the two figuring weft-threads may be so arranged in a loop of binder warp-threads as to be respectively in the upper ply and the lower ply, separated by the figuring warp-threads, or as to be both in the middle of the fabric covered by a figuring warp-thread in the upper ply and a figuring warp-thread in the lower ply. The weaving of the binder weft-threads may be the same throughout the fabric and the succession of the lifts of the binder warp-threads unvaried, while the figuring-threads may be varied within the loops of binder-threads, so as to produce a considerable diversification of color effects and structural appearance on the surfaces of the fabric.

It is obvious that other modifications may be made in the construction shown and above particularly described within the principles and scope of my invention.

What I claim, and desire to secure by Letters Patent, is—

1. A woven fabric having figuring weft-threads and binder weft-threads and binder warp-threads, the binder warp-threads binding the binder weft-threads with a single binder weft-thread in each loop of binder warp-threads and binding the figuring weft-threads with a plurality of figuring weft-threads in each loop of binder warp-threads.

2. A woven fabric having figuring weft-threads and binder weft-threads and figuring warp-threads and binder warp-threads, the binder warp-threads binding the binder weft-threads with a single binder weft-thread in each loop of binder warp-threads and binding the figuring weft-threads with a plurality of figuring weft-threads in each loop of binder warp-threads, the figuring warp-threads acting as stuffers between the surface-ply figuring weft-threads.

3. A woven fabric having figuring weft-threads and binder weft-threads and figuring warp-threads and binder warp-threads, the binder warp-threads binding the binder weft-threads with a single binder weft-thread in each loop of binder warp-threads and binding the figuring weft-threads with a plurality of figuring weft-threads in each loop of binder warp-threads, the figuring weft-threads acting as stuffers between the surface-ply figuring warp-threads.

4. A woven fabric having figuring weft-threads and binder weft-threads and figuring warp-threads and binder warp-threads, the binder warp-threads binding the binder weft-threads with a single binder weft-thread in each loop of binder warp-threads and binding the figuring weft-threads with a plurality of figuring weft-threads in each loop of binder warp-threads, the figuring warp-threads acting as stuffers between the surface-ply figuring weft-threads and the figuring weft-threads acting as stuffers between the surface-ply figuring warp-threads.

5. A woven fabric having figuring weft-threads and binder weft-threads and binder warp-threads, the binder warp-threads binding the binder weft-threads with a single binder weft-thread in each loop of binder warp-threads and binding the figuring weft-threads with two figuring weft-threads in each loop of binder warp-threads.

6. A woven fabric having figuring weft-threads and binder weft-threads and figuring warp-threads and binder warp-threads, the binder warp-threads binding the binder weft-threads with a single binder weft-thread in each loop of binder warp-threads and binding the figuring weft-threads with two figuring weft-threads in each loop of binder warp-threads, the figuring warp-threads acting as stuffers between the surface-ply figuring weft-threads.

7. A woven fabric having figuring weft-threads and binder weft-threads and figuring warp-threads and binder warp-threads, the binder warp-threads binding the binder weft-threads with a single binder weft-thread in each loop of binder warp-threads and binding the figuring weft-threads with two figuring weft-threads in each loop of binder warp-threads, the figuring weft-threads acting as stuffers between the surface-ply figuring warp-threads.

8. A woven fabric having figuring weft-threads and binder weft-threads and figuring warp-threads and binder warp-threads, the binder warp-threads binding the binder weft-threads with a single binder weft-thread in each loop of binder warp-threads and binding the figuring weft-threads with two figuring weft-threads in each loop of binder warp-threads, the figuring warp-threads acting as stuffers between the surface-ply figuring weft-threads and the figuring weft-threads acting as stuffers between the surface-ply figuring warp-threads.

9. A woven fabric having figuring weft-threads and binder weft-threads and binder warp-threads, each binder warp-thread passing from a figuring weft-thread to a binder weft-thread of one surface ply and binding the same and then passing backward through the fabric to a binder weft-thread of the other surface ply and binding the same and then passing to a figuring weft-thread, and passing from a figuring weft-thread to another figuring weft-thread between binder weft-threads bound in like manner by another binder warp-thread.

10. A woven fabric having figuring weft-threads and binder weft-threads and binder warp-threads, the binder warp-threads being arranged in two sets, the binder warp-threads of one set passing from a figuring weft-thread to a binder weft-thread of one surface ply and binding the same and then passing backward through the fabric to a binder weft-thread of the other surface ply and binding the same and then passing to a figuring weft-thread, and passing from a figuring weft-thread to another figuring weft-thread between binder weft-threads bound in like manner by the binder warp-threads of the other set.

11. A woven fabric having figuring weft-threads and binder weft-threads and binder warp-threads, the weft-threads being arranged in sets of eight weft-threads each, four figuring weft-threads and four binder weft-threads in each set, the binder warp-threads binding the binder weft-threads with a single binder weft-thread in each loop of binder warp-threads and binding the fiugring weft-threads with two figuring weft-threads in each loop of binder warp-threads.

12. A woven fabric having figuring weft-threads and binder weft-threads and binder warp-threads, the weft-threads being arranged in sets of eight weft-threads each, four figuring weft-threads and four binder weft-threads in each set, and the binder warp-threads being arranged in two sets, the binder warp-threads of one set passing from a figuring weft-thread to a binder weft-thread of one surface ply and binding the same and then passing backward through the fabric to a binder weft-thread of the other surface ply and binding the same and then passing to a figuring weft-thread, and passing from a figuring weft-thread to another figuring weft-thread between binder weft-threads bound in like manner by the binder warp-threads of the other set.

13. A woven fabric having figuring weft-threads and binder weft-threads and figuring warp-threads and binder warp-threads, the weft-threads being arranged in sets of eight weft-threads each, each set comprising, in succession, two binder weft-threads, two figuring weft-threads, two binder weft-threads and two figuring weft-threads, the binder warp-threads being arranged in two sets and binding the binder weft-threads with a single binder weft-thread in each loop of binder warp-threads and binding the figuring weft-threads with two figuring weft-threads in each loop of binder warp-threads.

14. A woven fabric having figuring weft-threads and binder weft-threads and figuring warp-threads and binder warp-threads, the weft-threads being arranged in sets of eight weft-threads each, each set comprising, in succession, two binder weft-threads, two figuring weft-threads, two binder weft-threads and two figuring weft-threads, the figuring warp-threads being arranged in pairs in two sets, and the binder warp-threads being arranged in two sets and binding the binder weft-threads with a single binder weft-thread in each loop of binder warp-threads and binding the figuring weft-threads with two figuring weft-threads in each loop of binder warp-threads, the figuring warp-threads acting as stuffers between the surface-ply figuring weft-threads and the figuring weft-threads acting as stuffers between the surface-ply figuring warp-threads, substantially as set forth.

In testimony whereof I have affixed my signature in presence of two witnesses.

THOMAS BENTON DORNAN.

Witnesses:
 A. C. SIMPSON,
 CHAS. I. McCUSKER.